United States Patent [19]

Cook et al.

[11] Patent Number: 4,701,288
[45] Date of Patent: Oct. 20, 1987

[54] METHOD OF MAKING ARTICLES OF DISSIMILAR POLYMER COMPOSITIONS

[75] Inventors: William H. Cook, Fairport; William G. Deichert, Macedon; Richard J. Wrue, Rochester; Norman R. Westfall, Penfield, all of N.Y.

[73] Assignee: Bausch & Lomb Incorporated, Rochester, N.Y.

[21] Appl. No.: 741,382

[22] Filed: Jun. 5, 1985

[51] Int. Cl.⁴ .......................................... B29D 11/00
[52] U.S. Cl. ................................ 264/1.4; 264/1.7; 264/1.9; 264/2.1; 264/2.5; 264/247; 264/255; 425/130; 425/174.4; 425/808
[58] Field of Search .................. 264/1.4, 1.7, 1.8, 1.9, 264/2.1, 25, 246, 247, 255; 425/808, 130, 174.4

[56] References Cited

U.S. PATENT DOCUMENTS

| | | | |
|---|---|---|---|
| 2,524,862 | 10/1950 | White | 425/808 |
| 2,525,664 | 10/1950 | Gadsby et al. | 425/808 |
| 3,454,332 | 7/1969 | Siegel | 264/1.8 |
| 4,022,855 | 5/1977 | Hamblen | 264/1.4 |
| 4,113,224 | 9/1978 | Clark et al. | 264/1.4 |
| 4,208,362 | 6/1980 | Deichert et al. | 264/162 |
| 4,460,523 | 7/1984 | Nufe | 264/1.7 |
| 4,472,327 | 9/1984 | Nufe | 264/1.9 |

FOREIGN PATENT DOCUMENTS 71830  4/1984  Japan ................................ 264/1.4

Primary Examiner—James Lowe
Attorney, Agent, or Firm—Christopher E. Blank; Craig E. Larson; Bernard D. Bogdon

[57] ABSTRACT

Hybrid contact lenses and other composite polymeric articles of precise dimensions are made by placing a first monomer composition in a mold and irradiating and polymerizing a central portion only with ultraviolet radiation. Unpolymerized monomer is removed, a second monomer composition is placed in contact with the polymer formed from the first monomer composition and the latter is polymerized by ultraviolet irradiation or by other means to obtain a composite article which is then machined to form a hybrid lens.

18 Claims, 9 Drawing Figures

METHOD OF MAKING ARTICLES OF DISSIMILAR POLYMER COMPOSITIONS

BACKGROUND OF THE INVENTION

1. Field of the Invention:

This invention relates to a manufacturing method and apparatus and more particularly to an apparatus for forming dissimilar polymer compositions into composite articles such as composite contact lenses.

2. Description of the Prior Art:

Composite contact lenses known as hybrid lenses have a hard center and a soft periphery. A central segment is formed of a rigid or hard plastic material and is bonded to a peripheral segment formed of a softer hydrophilic polymer. A virtue of such lenses is that the hard center, being resistant to distortion, has good optical properties while the soft periphery permits the lens to fit the eye more comfortably than would a completely hard lens.

A problem with hybrid lenses is the difficulty of manufacture and the difficulty of obtaining a satisfactory bond between the dissimilar polymers of the central and peripheral segments. For example, the patent to Graham, U.S. Pat. No. 4,166,255 discloses hybrid lenses which are manufactured by preforming the hard central segment, placing it in a mold, pouring the monomer for the soft segment over it and curing the latter. The Graham patent also discloses a method in which a preformed hard segment is encased on all sides in the soft polymer, evidently to obtain a better bond than would be achieved by the first-mentioned method. A lens of this kind is difficult to manufacture. Also stresses resulting from the wide area of contact of the two different polymers can distort the shape of the lens. Another method suggested by the patent, evidently also to obtain a better bond, is to diffuse the hard polymer into a central section composed of the soft polymer. In this method controlling the physical and optical properties of the polymer blend at the center of the lens is a problem.

The patent to Deichert et al U.S. Pat. No. 4,208,362 discloses a method for making composite lenses in which the bonding of polymers is improved by polymerizing a first monomer while inhibiting polymerization at the surface which is to be bonded to a second monomer. The second monomer is then contacted with that surface and polymerized. At the junction a random copolymer of the two monomers forms. This provides a transition section which bonds the two dissimilar polymers. Although the Deichert method is useful, it too has disadvantages. For instance, when the first liquid monomer is placed in a mold, the surface activity of the mold material and of the monomer may cause the monomer to creep beyond the desired level on the mold surface. When that monomer is then polymerized a polymer film is formed in the area that is intended for the second polymer. It is thus difficult to control the dimensions of the first polymer in the mold.

The patent to Kamath, U.S. Pat. No. 3,619,044 discloses a method for forming hybrid lenses in which a coating of polyacrylic acid is grafted onto a preformed rod of poly(4-methylpentene-1). Lens buttons are sliced from the coated rod. The buttons are then formed into lenses and are hydrated. A drawback of this technique lies in the difficulty of machining the buttons to a desired shape so that when hydrated the lenses will have the correct dimensions.

3. Brief Summary of the Invention

The present invention offers an improved method and apparatus for forming composite articles from dissimilar polymer compositions. In particular the novel method and apparatus produce articles having a good bond between the polymers and provide improved control of the dimensions of the different polymer segments in the composite articles. Although the invention is not limited to the manufacture of such articles, these advantages are especially valuable in the manufacture of composite or hybrid contact lenses.

The method of the invention comprises placing a quantity of a first polymerizable liquid vinyl monomer composition on a surface, exposing only a portion of the monomer to a predetermined pattern of actinic radiation and polymerizing the exposed portion, contacting at least an edge of the polymerized product with a second polymerizable liquid vinyl monomer composition which differs from the first monomer composition and polymerizing the second monomer to create a composite article having segments of dissimilar polymer compositions joined together by a vinyl copolymer bond.

In a preferred embodiment of the invention, the first monomer forms a relatively hard polymer, the second monomer forms a relatively soft polymer and the composite article is a composite contact lens.

In another preferred embodiment, the first monomer composition forms a transparent polymer that is free of solid particles, the second monomer forms a polymer that contains a dispersion of finely divided light-reflective solid particles and both polymers are tinted.

The apparatus of the invention comprises a means for supporting a layer of monomer during polymerization, a source of actinic radiation positioned to expose the surface of the monomer layer, means for confining the exposure of the monomer layer to a predetermined pattern, and means for providing a uniform intensity of the actinic radiation throughout the pattern of exposure, the means for supporting the layer of monomers being substantially non-reflective of the actinic radiation.

In preferred embodiments of the apparatus the radiation source is a source of ultraviolet radiation, the apparatus includes means for collimating the radiation and includes an opaque mask having an aperture of predetermined pattern for transmitting ultraviolet radiation.

BRIEF DESCRIPTION OF THE DRAWINGS

The invention will be described in more detail by reference to the drawings of which

DETAILED DESCRIPTION OF THE INVENTION

Figure 1:
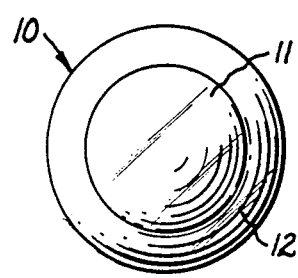
FIG. 1 is plan view of a hybrid contact lens made by the method of the invention.

FIG. 1 shows a contact lens 10 made by the method of the invention. The central optical segment 11 of the lens 10 is circular in plan view and is joined to an annular peripheral segment 12. The central segment 11 is formed of a relatively hard transparent vinyl polymer and the annular segment 12 is formed of a relatively soft hydrated transparent hydrophilic vinyl polymer, both vinyl polymers being formed by the free radical polymerization of vinyl monomers. Preferred polymers are non-cytotoxic.

The relatively hard polymer for the central segment 11 preferably has a light transmittance greater than 90 percent by the Standard Method of Test for Transparency of Plastic Sheeting (ASTM D 1746-70). Acrylic polymers are especially useful. Illustrative acrylic monomers are methyl methacrylate, ethyl methacrylate, isopropyl methacrylate, s-butyl methacrylate, t-butyl methacrylate, phenyl methacrylate, cyclohexyl methacrylate, 3,3,5-trimethylcyclohexyl methacrylate t-butyl acrylate, tetrahydrofurfuryl methacrylate, allyl methacrylate, cyclohexyl acrylate, tetrahydrofurfuryl acrylate, and others. From the foregoing it is obvious that the term vinyl monomer is used in a broad sense which includes acrylic monomers, including methacrylate monomers. Other useful monomers include vinyl monomers which contain silyl groups, such as siloxanylalkyl vinyl acetate ester monomers such as disclosed in the patent to Ivani, U.S. Pat. No. 4,410,674, of which bis(-methacryloxybutyl) tetramethyl disiloxane is an example.

Also useable in center segment 11 are copolymers formed by combining two or more vinyl monomers. If desired, cross-linking monomers may be added, such as ethylene glycol dimethacrylate, ethylene glycol diacrylate, pentaerythritol tetracrylate, and trimethylolpropane trimethacrylate. Preferably, from 70 to 100 percent by weight of the vinyl polymer in center section 11 is formed from one or more of methyl methacrylate, tetrahydrofurfuryl methacrylate and cyclohexyl methacrylate and from 0 to 30 percent by weight of one or more of ethylene glycol dimethacrylate, diethylene glycol dimethacrylate, triethylene glycol dimethacrylate or tetraethylene glycol dimethacrylate.

The polymer of annular segment 12 can be for example, any of the well-known polymers used in soft contact lenses. These are wettable, hydrophilic vinyl polymers which are sparingly crosslinked. When hydrated they swell and become soft hydrogels, e.g., having a Shore hardness of 60 or less on the A scale. Preferably, the polymer has good light transmittance.

The hydrogel polymers can be made by the free-radical polymerization and crosslinking of a monomer composition containing one or more vinyl monomers. Preferred monomers include esters and amides of acrylic and methacrylic acid which have at least one hydrophilic functional group and vinyl pyrrolidinones.

Examples include the hydrogels obtained by hydrating the polymers of monomers of hydroxyalkyl methacrylate, the alkyl group having 2 or 3 carbon atoms, which are crosslinked with about 0.1 to 2 percent by weight of an acrylic or dimethacrylic ester of an alkylene glycol having 2 to 3 carbon atoms or with divinylbenzene.

Especially useful hydrogel polymers are crosslinked polymers made from the following monomers and mixtures of monomers:
2-hydroxyethyl methacrylate (also known as HEMA)
HEMA with methacrylic acid
HEMA with 1-vinyl-2-pyrrolidinone
HEMA with 1-vinyl-2-pyrrolidinone and methacrylic acid
HEMA with 1-vinyl-2-pyrrolidinone and methyl methacrylate
HEMA with N-(1,1-dimethyl-3-oxobutyl) acrylamide
1-Vinyl-2-pyrrolidinone with methyl methacrylate and allyl methacrylate Preferred crosslinking agents for these monomers include divinylbenzene, 1,3-propandiol dimethacrylate and ethylene glycol and poly(ethylene glycol) dimethacrylates.

In both monomer compositions a conventional free radical polymerization catalyst preferably is included. Examples include benzoin methyl ether, dibenzoyl peroxide and azobisisobutyronitrile. The vinyl polymerization is normally exothermic and no heat need be supplied to promote polymerization. In fact in polymerizing the first monomer composition by irradiation it is preferred to maintain the reactants at room temperature in order that polymerization will occur only in areas subjected to irradiation. It is not essential, however, to irradiate the second monomer composition. It can be polymerized by any method, including heating, catalysis, crosslinking, irradiation or combinations thereof.

In manufacturing hybrid contact lenses having a hydrogel periphery, it is desirable to prevent swelling and deformation of the lens during hydration. This can be done by including an inert diluent substance in the hydrogel monomer composition. The diluent occupies space in the three dimensional crosslinked polymer that subsequently is occupied by water. When the lens is hydrated, water or saline solution replaces the diluent in an equal volume exchange. The lens, therefore, does not appreciably change its dimensions when hydrated, in contrast to the situation in which a soft hydrogel lens is made without a diluent and is then hydrated. In the latter case the lens swells and if it is bonded to a hard segment, as in a hybrid lens, the lens is deformed. Use of a diluent during polymerization of the hydrogel monomer avoids this problem.

Preferred diluents in the method of the invention are non-volatile, viscous inert liquids such as diethylene glycol monobutyl ether and glycerine. Other possible diluents include the solid diluents disclosed in the patent to Erikson, U.S. Pat. No. 4,121,885.

Figure 2:
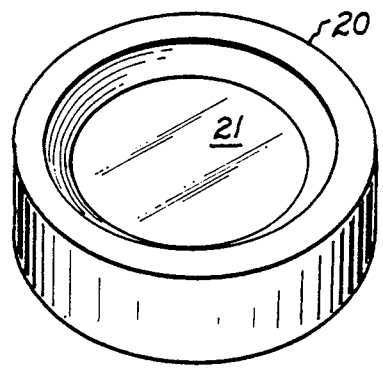
FIG. 2 is a diagramatic perspective view of apparatus in which the method of the invention can be practiced.

FIG. 2 shows in perspective a plastic mold 20 which can be used in the method of the invention for making composite contact lenses. The mold has a concave surface onto which is injected a monomeric composition 21.

Figure 3:
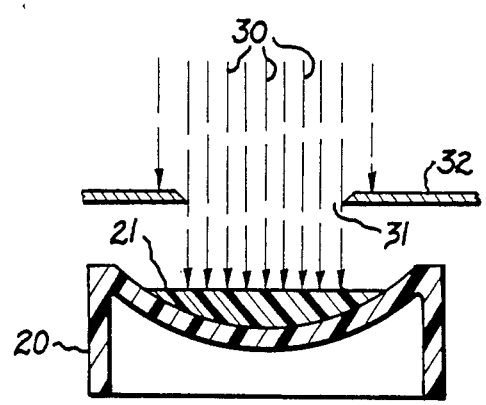
FIGS. 3–8 are diagramatic side views in section of molds, as employed at different stages and in different embodiments of the method of the invention.

FIG. 3 of the drawing shows the mold in cross section during a first step in an embodiment of the novel method for making a composite lens. In this embodiment a quantity of a first polymerizable monomer composition 21 is placed on the concave surface of plastic mold 20. This monomer can be of the type which forms a hard polymer. The monomer composition spreads to form a layer on the surface of the mold. The monomer can spread simply by gravitational flow or it can be spread centrifugally by spinning the mold about a vertical axis through the center of its concave surface. A central portion of the liquid monomer 21 is then subjected to actinic radiation such as ultraviolet radiation 30 from a source such as a sun lamp, not shown in the drawing. The radiation passes through an aperture 31 in an opaque mask 32.

For optimum results, all regions of the monomer are uniformly irradiated. This contributes to uniformity of the polymer and reduces stresses within the composite article. Uniformity of irradiation is achieved by using suitable means for providing a uniform intensity of actinic radiation throughout the pattern of exposure. Preferably, this is done by collimating the radiation. Collimation can be achieved by any optical means for producing parallel rays, for example, by using a pinhole radiation source in combination with a converging objective lens, or by exposing through a pair of mask apertures placed in series between the radiation source and the mold. In addition to providing uniform exposure of the monomer, collimation of the radiation also contributes to precise control of the area of irradiation.

Figure 4:
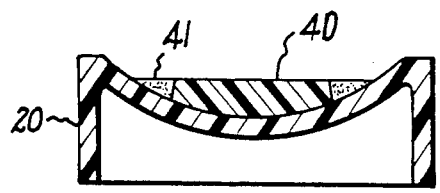

As shown in FIG. 4, the irradiated central portion of the monomer forms a solid polymer 40 while the peripheral portion 41 remains liquid. The degree of polymerization of the central portion at this stage can vary. It can be polymerized to a high molecular weight hard polymer during this stage or, if desired, it can be merely polymerized enough to retain its desired shape and to separate it from the unpolymerized liquid monomer. In the latter event, the central portion can be more fully polymerized in a later stage.

Figure 5:
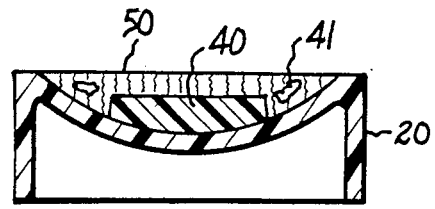

FIG. 5 shows the next step in this embodiment of the method. A quantity of a second monomer composition 50 is placed in the mold in contact with the polymer 40. The second monomer is of the kind that forms a hydrophilic polymer that is soft after being hydrated. In the embodiment illustrated by FIG. 5 the second monomer is of higher density than the first monomer. Consequently, when the second monomer is injected into the mold, the unpolymerized portions 41 of the first monomer are displaced by the second monomer in the peripheral region surrounding polymer 40. The first monomer 41, in effect, floats away from the periphery of polymer 40 as shown in FIG. 5, and the periphery fills with monomer 50. The mask 33 having been withdrawn, the entire surface of the mold is then exposed to uniform actinic radiation such as collimated ultraviolet radiation. This causes polymerization of the second monomer and the formation of a composite polymeric article composed of the hard segment 40 and the soft segment 50.

Although the procedure that has been described is useful when the second monomer is of lower density than the first and will displace the unpolymerized portions of the first polymer, it is also possible in the method of the invention to remove the first monomer from the mold before introducing the second monomer. This embodiment of the method is especially useful when the second monomer is less dense than the first.

Figure 6:
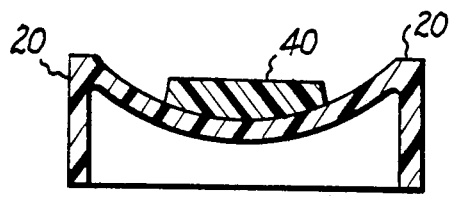
Figure 8:
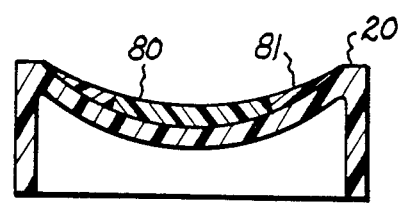
Figure 7:
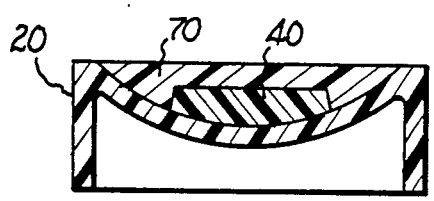

The unpolymerized portions of the first monomer, if sufficiently liquid, can be removed simply by aspiration with a micropipette. Preferably, however, a solvent for the first monomer is placed in the mold and the dissolved monomer is then readily removed by pipette. Further extraction with a solvent can remove essentially all of the monomer. When this is completed the polymerized central segment 40 of the first monomer remains in the mold as shown in FIG. 6. Then, as shown in FIG. 7, a quantity of the second monomer 70 is then placed in the mold, and the latter is polymerized in the manner described in connection with FIG. 5. To form a hybrid contact lens from the composite article of FIG. 5 and FIG. 7 two further steps are needed. First, as shown in FIG. 8, the excess polymer is cut away from the upper surface of the composite article of FIG. 5 and FIG. 7 to form the posterior concave surface of contact lens 80 in FIG. 8. Subsequently, the lens is soaked in a saline solution in conventional manner to hydrate its annular portion 81.

Although it is often desirable to remove the unpolymerized monomer from the peripheral region, as described, it is also possible in accordance with the invention to allow at least part of the first monomer to remain in the peripheral region, in which case it copolymerizes with the second monomer when the latter is introduced. Thus, the method can be used to make articles in which one polymeric segment is formed from the first monomer and another is formed by copolymerization of the first and second monomers.

An unexpected advantage results from the described method. When the central portion of the first monomer is irradiated through the mask 33, apparently because of an edge effect of the radiation and the mask aperture, the periphery of the polymerized segment is only partially polymerized. Although we do not wish to be bound by any theoretical explanation, it appears that the peripheral surface for some substantial depth remains reactive. Consequently, when it is contacted with the second monomer and irradiated, a random or graft copolymer forms at the interface along the periphery of the central polymer. This copolymer provides a good bond between the two polymeric segments of the composite lens or other article, much as in the transition section of the lens described in Deichert et al patent U.S. Pat. No. 4,208,362.

It appears that the copolymerized bond which occurs at the interface of the two dissimilar polymers results from gradation in the intensity of the radiation in the immediate region of the interface. Although the lens mold is irradiated uniformly throughout the exposed region, right at the edge of the exposed region, instead of ceasing abruptly the radiation extends in lesser intensity for a short distance beyond the edge. This can be caused by two or more effects, i.e., by the edge effect of the aperture which causes some scattering of the otherwise uniform, collimated radiation and by a small amount of scattering which is caused by the monomer itself. As a consequence, some stray radiation extends a short distance beyond the intended edge and creates a thin region which is only partially polymerized and which is reactive with the second vinyl monomer when it is injected into the boundary region and irradiated. It is also contemplated that a small amount of monomer flows just beyond the irradiated region as the monomer begins to polymerize but before it solidifies, thus also helping to create a boundary region of incompletely polymerized monomer which is reactive with the second monomer when it is injected and polymerized. Although this boundary region is quite thin, the covalent bonding which evidently occurs by copolymerization of active vinyl groups produces a strong bond.

Figure 9:
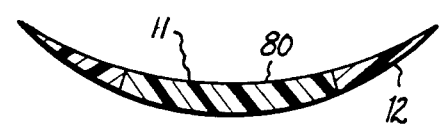
FIG. 9 is a sectional view of a lens made by the method of the invention.

A valuable feature of the lens made by the method of the invention is illustrated in cross-section by FIG. 9. As it shows, the bond between the polymeric segments 11 and 12 extends in a direction or line which is approximately normal with respect to the anterior and posterior surfaces of lens 80. A consequent advantage in the case of hybrid lenses is that the area of contact between the segments of dissimilar polymer composition is minimal. Therefore, whatever stresses develop because of differences in shrinkage or expansion of the dissimilar polymers are at a minimum. The lens of the present invention is, therefore, less subject to being physically distorted by internal stresses than a lens such as shown in Deichert et al U.S. Pat No. 4,208,362 where the contact area between the dissimilar polymers is relatively large.

The lens of the present invention provides the advantage of a small bonding area, thus minimizing deformation, and the advantage of a strong copolymer bond. Another advantage is that by extending in a direction approximately normal to the lens surfaces, the bond occupies a minimal part of the optical region of the lens. To the extent that the bond is different in composition from the central optical region and the peripheral region it can cause optical abberations. Preferably, therefore, it should occupy a minimal part of the optical region or the field of vision of the lens wearer. Clearly, the bond in the lens made by the method of the invention, which extends approximately in the direction of the line of sight of the wearer, occupies much less of the field of vision than a wide bond such as that of the Deichert et al lens which extends across the line of sight.

The following example illustrates the making of a composite or hybrid contact lens having a soft peripheral segment and a hard optical segment by the method of the invention. Unless otherwise indicated, parts and percentages are by weight.

EXAMPLE

The optical zone liquid monomer composition, consisting of 15 microliters of a mixture of 70 parts of the comonomer, 1,3-bis (4-methacryloxybutyl) tetramethyl disiloxane, 15 parts of the comonomer, isobornyl methacrylate, 15 parts of the cross-linking agent, ethylene glycol dimethacrylate, 5 parts of the wetting agent comonomer, di(trimethylsilyl) methacryloyl-L-glutamic acid, and 0.525 parts of the catalyst, benzoin methyl ether, was injected by pipette onto the concave surface of a contact lens mold. The 6.5 mm clear circular aperture of an opaque mask was centered on top of the mold and the assembly was placed in an inert (nitrogen) atmosphere. The mold was illuminated from above with ultraviolet radiation (wavelength=365 nm) from a General Electric Company RS sun lamp at 40,000 microwatts/$cm^2$ for 2.5 minutes. The mask was then removed and 0.5 ml of peripheral zone liquid monomer composition consisting of 59 parts of the monomer, 2-hydroxyethylmethacrylate, 1.7 parts of cross-linking agent, ethylene glycol dimethacrylate, 0.12 parts of catalyst, benzoin methyl ether, 10.5 parts of a diluent, glycerine, and 24.3 parts of a diluent, diethylene glycol monobutyl ether, were injected into the mold, filling the mold and covering the optical zone polymer. The mold was again placed in an inert atmosphere and exposed without the mask to UV radiation at 40,000 microwatts/$cm^2$ for 30 minutes. The resultant polymerized composite lens blank was machined to produce a lens of approximately 0.15 mm uniform thickness. To hydrate the peripheral zone polymer, the lens was placed in a 0.9% saline solution for 24 hours. In the resulting lens the transition junction between the soft peripheral zone polymer and the hard optical zone polymer was smooth and strong.

As previously mentioned, an important advantage of the novel method in the manufacture of composite contact lenses and other composite polymeric articles is that it offers precise control of the dimensions of the different segments of the article. Whereas in the method of the Deichert patent U.S. Pat. No. 4,208,362, the first liquid monomer tends to creep along the surface of the mold, and when polymerized forms film extending beyond the desired dimensions for the first polymer, in the present method the first monomer polymerizes only in the exposed area and the unpolymerized first liquid monomer on the mold can be totally removed. Consequently, by controlling the dimensions of the mask aperture the dimensions of the segments of the composite polymeric article are controlled precisely.

Although a circular aperture has been described, other shapes, such as ovals, squares, triangles and other regular or irregular shapes can be used. Also a plurality of apertures of any desired shape can be used. Furthermore, the edge of the aperture can have a fluted, or serrated or other edge configuration for special effects or even to improve the bond strength between segments. The method of the invention also includes irradiation of the first monomer in an annular pattern and then polymerizing the second monomer at the center of the annular polymer. This is conveniently achieved by using a mask having an annular aperture.

Although an opaque mask with a clear aperture was used in the Example, the method of the invention can also use masks of graduated density. This enables one to control the degree of polymerization. For instance, if, instead of a mask with a sharply defined aperture edge as in the Example, one uses a mask in which the area between the clear aperture and the opaque area transmits some but not all of the UV radiation, e.g., an area of decreasing optical density, a wider transition zone for copolymerization and bonding with the second monomer is provided. This is advantageous if a more gradual change in the physical properties in moving from one polymeric segment to the other is desired or if a more extensive and possibly stronger copolymer bonding region is desired.

In the drawing, a mask such as a plate of metal or opaque plastic is shown but any means for masking radiation exposures or irradiating in desired patterns can be used, including optical exposure with actinic radiation though a photographic image transparency and directed with one or more lenses onto the monomer surface. This kind of mask offers a multitude of choices of radiation patterns. Still another possibility is to expose the monomer by scanning its surface with a laser emission of actinic radiation in any desired pattern.

The Example has described the making of a contact lens having a hard center and a soft periphery. The method of the invention is not limited, however, to making such articles. It can be used, in general, for making composite polymeric articles having dissimilar polymer segments, when the polymers are made from monomer compositions containing vinyl monomers.

The terms "dissimilar polymer" and "dissimilar polymer compositions" as used herein refer to polymers which differ from each other in any way. They may, for example, differ because they are made from entirely different vinyl monomer compositions, or one polymer may be a homopolymer and the other a copolymer, or they may comprise identical polymers but contain different addenda such as dyes, pigments or reflective particles, or they may be made from the same monomers but be polymerized to a different molecular weight or be crosslinked to a different degree. Polymers having any such differences are considered to be dissimilar polymers.

Thus, among the various composite polymeric articles that can be made by the method of the invention are contact lenses having different segments in which either segment is soft or hard, or in which both are either soft or hard but differ in composition in some manner.

An example of a lens of the latter type is disclosed in the patents of C. W. Neefe, U.S. Pat. Nos. 4,460,523 and 4,472,327, which are incorporated by reference herein. These two patents disclose a new kind of cosmetic contact lens. The lens has a central circular zone formed of a transparent, and preferably colored polymer. Around the circular zone is a concentric annular zone of colored transparent polymer in which light-reflecting particles are dispersed. A second annular zone of clear transparent polymer is formed around the first annulus. When the lens is placed on the eye, the inner circular zone corresponds to the pupil and the first annular zone corresponds to the iris. Although a conventionally tinted contact lens has limited effect on changing the apparent color of the iris, and essentially no effect in lightening the color of dark eyes, in this kind lens, when light impinges on the reflecting particles dispersed in the colored annular zone, it reflects back as colored light. Consequently, a wearer can have almost any iris color he chooses.

The methods for making cosmetic tinted lenses disclosed in the Neefe patents, although useful, have certain drawbacks. An improved way of making them is by the method of the present invention. In this method the first monomer composition comprises, for example, a monomer such as HEMA, a crosslinking agent, a catalyst, and a non-volatile viscous diluent. It forms a clear, transparent hydrogel when irradiated and hydrated. The second monomer composition contains the same reactive components plus a dispersion of finely divided light-reflective solid particles such as particles of titanium dioxide of average particle size in the range from 0.1 to 20 microns and in a concentration up to about 1 weight percent based on the monomer, and preferably from 0.05 to 0.60 weight percent.

These two compositions are polymerized to form a composite article having a transparent central circular portion which contains no reflective solid particles and a surrounding annular portion which contains the reflective particles. After machining the composite article in the mold to the desired lens shape, the lens is then tinted by treating its surface with a suitable dye. Alternatively, the dye can be included in both monomer compositions or in only the second monomer composition for the annular segment. It is also within the scope of the invention to polymerize another annular segment which is untinted around the tinted annular segment. This third segment may or may not contain reflective particles. It will extend over the scleral region of the eye.

In certain embodiments of the invention, e.g. in making contact lenses for which extreme precision is required, certain other conditions are preferred in using the novel method. The use of collimated radiation is one such condition which has already been mentioned. This is desirable for achieving uniform polymerization throughout the mass of monomer. If the monomer is not uniformly irradiated the monomer may polymerize non-uniformly and the resulting stresses may distort the shape of the lens. With some polymers, however, notably those which are highly crosslinked, it is possible to achieve reasonably uniform polymerization without using collimated radiation.

Another condition for preferred embodiments of the invention is in the control of the optical properties of the mold. Contact lens molds normally are composed of plastics such as polyolefins, nylon, polyesters and the like. Some common plastic mold materials are not suitable for preferred embodiments of the method of the invention. We have found that they cause specular reflection or back-scattering of the radiation when used in our novel method. This in turn causes unwanted exposure and therefore uncontrolled polymerization in regions of the monomer outside of the desired zone for polymerization.

Consequently, in the method of the invention the preferred mold materials are non-reflective polymeric compositions which either transmit or absorb all of the actinic radiation. Especially suitable are highly transparent amorphous polymers such as polycarbonates, polymethylmethacrylate, polyvinyl chloride, or cellulose butyrate. Suitable radiation absorbing materials include polymers, whether crystalline or amorphous which are filled with carbon black or with an organic UV absorbing dye such as 2-hydroxy-4-methoxybenzophenone. Some polymers are inherently UV absorbing and, therefore, require no other component. Such polymers include certain polyether imides, polyamides and polysulfones.

Another technique that can be used in accordance with the invention to prevent polymerization of the monomer by stray radiation in unwanted regions is to incorporate a small amount of a polymerization inhibitor in the monomer composition. An example of a suitable inhibitor is methyl ether hydroquinone. Only a small amount is used, e.g., from 5 to 100 parts by weight per million parts of monomer, for if too much is used the monomer will not polymerize adequately. By using a small amount of polymerization inhibitor it is possible to use reflective mold materials that might otherwise be unsatisfactory.

The Example describes the use of a stationary mold in the method of the invention. It is also possible to spin the mold, as in the well-known spin-casting technique, for one or more stages of the method. Preferably in contact lens manufacture by the method of the invention, the mold is spun at least in the second stage, i.e. when the monomer for the soft peripheral region is introduced and polymerized. The reason for this is that in a concave mold, such as shown in the drawings, if the mold is not spun a large volume of the second monomer must be introduced to cover the central or optical zone polymer and to spread over the full extent of the peripheral zone. The mass of the second monomer is then several times greater than that of the first monomer. Since the polymerization is exothermic, a large amount of heat is generated if a large amount of the second monomer is used. Without taking steps to control it, the temperature in the mold will rise to 250° F. or higher. This can distort the dimensions of the optical zone polymer.

A way to avoid this problem in accordance with the invention is to use only a small amount of the second monomer and then to spin the mold to spread the monomer in a thin layer over the desired extent of the peripheral region of the lens. In this way, the exothermic temperature rise is kept within proper bounds. Also by using less of the second polymer, less is wasted when the lens blank is lathed or otherwise trimmed and polished to form the final lens. After lathing the soft-periphery hybrid lens the lens must be hydrated, e.g., by soaking in a saline solution in known manner.

Although the invention has been described in detail with reference to certain preferred embodiments, variations and modifications can be made within the spirit and scope of the invention as described above and as described in the claims.

We claim:

1. The method of forming composite polymeric articles having dissimilar polymer segments which comprises:
   (a) placing a quantity of a first polymerizable liquid vinyl monomer composition on the supporting surface of an open container;
   (b) exposing a portion only of the first monomer composition to a predetermined pattern of actinic radiation and polymerizing in an inert atmosphere all of said exposed portion;
   (c) contacting at least the periphery of the polymerized first monomer composition with a second polymerizable liquid monomer composition containing a vinyl monomer that is reactive with a vinyl monomer of the first monomer composition; and
   (d) polymerizing said second monomer composition to create a composite article having dissimilar polymer compositions joined together.

2. The method according to claim 1 wherein the first monomer composition forms a relatively hard polymer and the second monomer composition forms a relatively soft hydrophilic polymer.

3. The method according to claim 1 wherein the first monomer composition contains no reflective solid particles and forms a transparent polymer and the second monomer composition contains the same reactive components as the first plus finely-divided light reflective solid particles.

4. The method according to claim 3 wherein the first and second monomer compositions contain a dye.

5. The method according to claim 3 wherein after polymerizing the first and second monomer compositions, the resulting polymers are tinted with a dye.

6. The method according to claim 1 wherein the first monomer composition is polymerized by exposure to actinic radiation in a stationary mold and the second monomer composition is polymerized in a spinning mold.

7. The method according to claim 1 wherein both monomer compositions are polymerized while in a spinning mold.

8. The method according to claim 1 wherein the radiation comprises a predetermined pattern of collimated ultraviolet radiation.

9. The method according to claim 1 wherein the unpolymerized portion of the first monomer composition is removed from the mold before the second monomer composition is introduced.

10. The method according to claim 2 wherein the resulting composite article is subjected to hydration to form a hybrid contact lens having a hard center segment and a soft peripheral segment.

11. The method according to claim 1 wherein the first monomer composition is exposed to collimated ultraviolet radiation through an aperture in an opaque mask.

12. The method according to claim 1 wherein the supporting surface is non-reflective of said actinic radiation.

13. The method according to claim 1 wherein the supporting surface is a concave mold surface which is non-reflective to actinic radiation and the first monomer composition is exposed to a predetermined pattern of collimated ultraviolet radiation through an aperture in an opaque mask.

14. Apparatus for manufacturing polymeric articles of precise dimensions from monomers which comprises:
   (a) means for supporting a layer of polymerizable first monomer in a one-piece open container during polymerization;
   (b) a source of actinic radiation for exposing the surface of said first monomer layer;
   (c) means for confining the exposure of the surface of said first monomer layer to a predetermined pattern of actinic radiation;
   (d) means for providing a uniform intensity of said actinic radiation throughout the pattern of exposure;
   (e) first and second means for delivering the desired first and second monomer compositions to said open container; and
   (f) means for providing an inert atmosphere adjacent surface of said monomer to be polymerized by actinic radiation; and
   (g) means for confining the exposure of said first and second monomer compositions by actinic radiation to a predetermined pattern.

said means for supporting the layer of polymerizable monomer being substantially non-reflective of the actinic radiation.

15. Apparatus according to claim 14 wherein the source of actinic radiation is a source of ultraviolet radiation and the means for providing a uniform intensity of radiation is a collimating means.

16. Apparatus according to claim 15 wherein the means for confining the exposure to a predetermined pattern is an opaque mask having an aperture of predetermined pattern for transmitting the actinic radiation.

17. Apparatus according to claim 15 wherein the aperture is of graduated density for transmitting the actinic radiation 18. Apparatus according to claim 15 for manufacturing polymeric contact lenses wherein the supporting means is a mold cavity which corresponds in shape to one side of the desired lens.

* * * * *